H. R. WOODROW.
METHOD OF AND APPARATUS FOR ELECTRIC WELDING.
APPLICATION FILED JUNE 28, 1915.
1,183,264. Patented May 16, 1916.
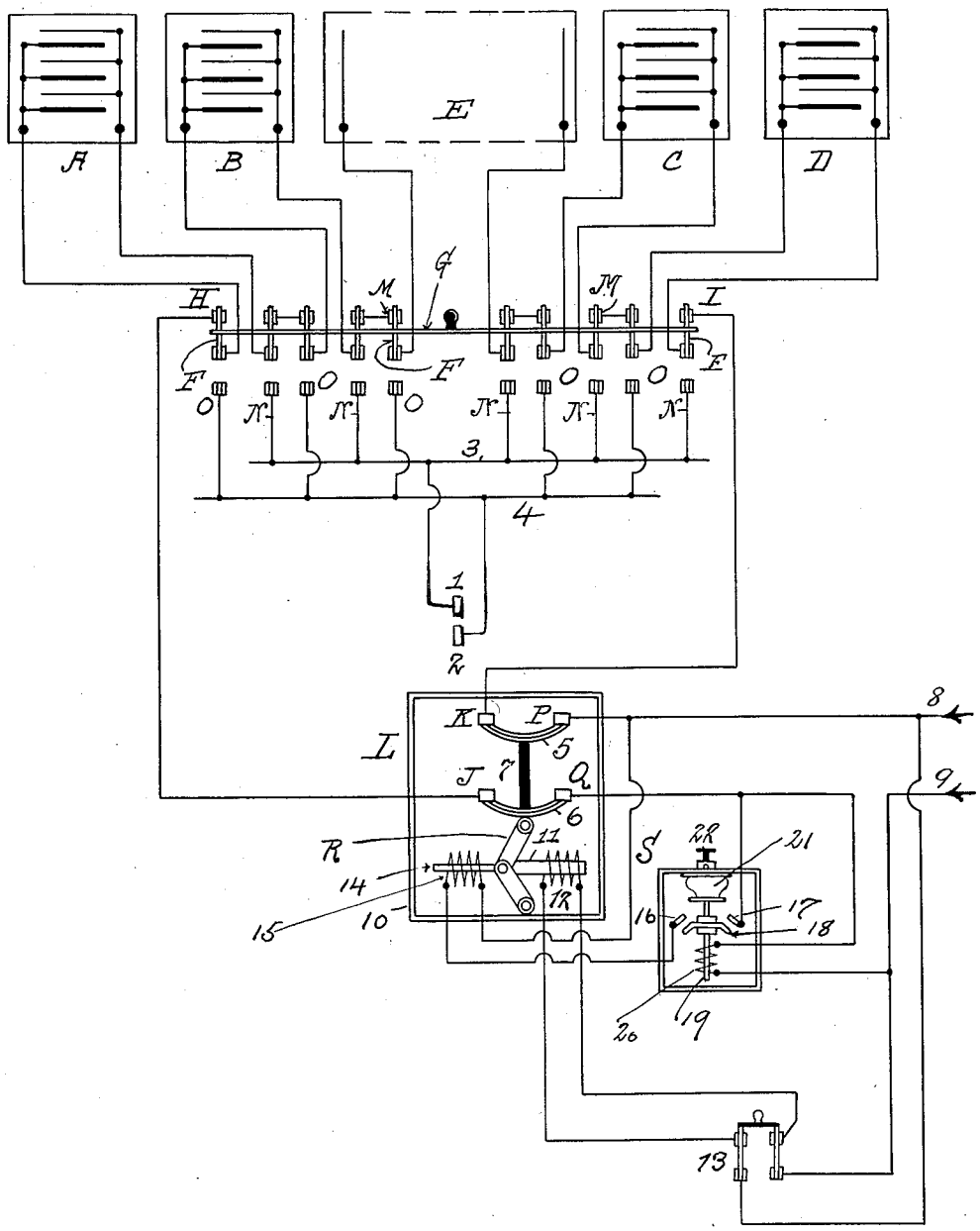

UNITED STATES PATENT OFFICE.

HARRY R. WOODROW, OF NEW YORK, N. Y., ASSIGNOR TO THOMAS E. MURRAY, OF NEW YORK, N. Y.

METHOD OF AND APPARATUS FOR ELECTRIC WELDING.

1,183,264.       Specification of Letters Patent.     Patented May 16, 1916.

Application filed June 28, 1915. Serial No. 36,708.

*To all whom it may concern:*

Be it known that I, HARRY R. WOODROW, a citizen of the United States, residing at New York, in the county of New York and State of New York, have invented a certain new and useful Improvement in Method of and Apparatus for Electric Welding, of which the following is a specification.

The invention is a method of electric welding by direct current, and an apparatus whereby said method may be carried into practical effect. Hitherto direct current welding has not come into use, because the voltage on light and power circuits is too high and because direct current transformers are both expensive and inefficient. In addition, there exist the serious difficulties incident to direct switching of these high currents and the voltage fluctuations on the mains. I have solved the problem of welding together two pieces of metal by direct current enegy in an infinitesimal and practically instantaneous period of time with high efficiency and small power requirements from the direct source.

The principle of my invention is this: to accumulate gradually a definite charge of electricity from a source of direct current, and then to discharge said definite accumulated charge practically instantaneously at the welding electrodes. To this end I charge storage cells connected in series with a direct current of predetermined voltage for a predetermined period of time, thereby accumulating in said cells and during said predetermined period a definite charge or amount of electrical energy. I then discharge that accumulated energy in an extremely brief and practically instantaneous period of time by connecting said cells in parallel or multiple to the welding electrodes, thus obtaining an enormous instant output of energy at said electrodes. I accomplish this wholly independently of the personal equation of the operator, and without circuit opening devices for disconnecting the source of direct current supply when the weld is completed. I preferably use storage cells having a very large electrode surface, a very thin formation of the plates and an electrolyte of low resistance. I also preferably employ an automatic charging device, comprising a time limit relay switch which can be adjusted to charge the storage battery with a definite amount of energy, dependent upon the size of the weld to be made, so that upon discharge, as set forth, a strong and perfect weld will be formed without burning of the metal.

The accompanying drawing is an electrical diagram illustrating my invention.

A, B, C and D represent storage cells, A and B being disposed at one end of the series, and C and D at the other end. The intermediate cells are indicated generally by the dotted parallelogram at E. The terminals of the cells are connected to the pivots of a series of switch levers F, said levers being united by a cross-bar G, so that all may be operated simultaneously by a handle on said bar. The switch levers F coöperate with a series of fixed contacts. The end contacts H, I of the series are connected to the contacts J, K of a double switch, generally designated as L. The intermediate contacts M of the series are connected in pairs. When the switch levers F are in the position shown in the drawing, and so coöperating with contacts H, I and M, the storage cells become connected in series with the contacts J, K.

The welding electrodes are indicated at 1, 2. The electrode 1 is connected to a conductor 3, to which are connected in multiple the fixed contacts N. The electrode 2 is connected to a conductor 4, to which are connected in multiple the alternating fixed contacts O. When the switch levers F are swung to coöperate with the contacts N, O, the storage cells become connected in multiple with the welding electrodes 1, 2. The switch L has two spring contact arms 5, 6, connected by an insulating bar 7. The arm 5 coöperates with the contact K and the contact P. The contact P is connected to a circuit lead 8 from any suitable source to direct current. The other circuit lead 9 is connected to the contact Q, with which contact and the contact J the other arm 6 of switch L coöperates. When the switch L is closed and the switch levers F connect the storage cells in series, then the direct current is established from leads 8, 9 to said cells in order to charge the same.

In order to operate the switch L, I provide a toggle R, pivoted to a suitable support 10 at one end and to the switch arm 6 at the other. To the pivot pin of the toggle joint is connected the plunger armature 11 of an electro-magnet 12, the terminals of which are respectively connected to circuit leads 8, 9, in which is interposed a hand switch 13. When switch 13 is closed, the electro-magnet 12 is energized and operates the toggle R to close switch L.

The time period of charging the cells is to be predetermined and regulated. This I may do by various means. One preferable device is here illustrated.

Also connected to the toggle pivot pin is a plunger armature 14 which enters an electro-magnet coil 15. One terminal of said coil is connected to lead 8: the other terminal is connected to a fixed contact 16 in a time limit relay, generally indicated at S. A second fixed contact 17 in said relay connects to lead 9.

A switch arm 18 which coöperates with contacts 16, 17 is carried by the plunger armature 19 of an electro-magnet coil 20, which coil is interposed in the circuit lead 9. The switch arm 18 takes its lowest position by gravity, and is, therefore, normally out of coöperation with contacts 16, 17. When circuit is closed through coil 20, the arm 18 is prevented from immediately closing circuit between contacts 16, 17 by means of a bellows 21, the lower side of which is secured to said arm, and the upper side to a suitable fixed support. The arm 18 when forced upward by the electro-magnet 20 tends to compress said bellows. But this compression is delayed by the air in said bellows, which is permitted to escape therefrom only through a small opening provided with a regulating screw valve, indicated at 22. By adjusting said valve, the time of delay in the closing of circuit at relay S is determined. When said circuit is finally closed, the electro-magnet 15 is energized to move the toggle joint in the reverse direction to that which it has been moved by magnet 12, and so to open circuit at switch L. The magnet coil 15 may be constructed in any suitable way to overcome the pull of coil 12.

The mode of operation is as follows: The levers F are placed in the position shown in the drawing to connect the storage cells in series. Hand switch 13 is closed, thus energizing magnet coils 12 and 20. Magnet 12 operates immediately to close circuit at switch L, and so from the source of direct current to the storage cells. The charging of said cells begins. Magnet coil 19 in switch S also being energized, begins to lift its arm 18 toward contacts 16 and 17, but this movement is delayed by the slow escape of air from bellows 21. The period of delay has, however, been previously determined by adjustment of valve 22. As soon as that period is ended, circuit is closed at switch S, and so to the electro-magnet coil 15 which instantly trips the toggle R. Circuit is then broken from the source of current to the storage cells, which, therefore, have received a direct current of known voltage for a predetermined period of time, and by that current have been charged with a definite amount of energy. The switch levers F are then moved to coöperate with the contacts N, O. Because said cells are now connected in multiple to the welding electrodes 1, 2, the definite amount of energy in the cells is delivered to said welding electrodes practically instantaneously.

In practice, I prefer to construct the storage battery of a large number of very thin, slightly formed lead plates in sulfuric acid solution, and charge the same in series for from five to ten seconds. When the battery is connected in multiple to the welding electrodes, the accumulated energy is discharged in a fraction of a second, thus giving an enormous output of energy at the weld in an almost infinitesimal period of time. This is the ideal condition for short time welding, and always produces a good weld.

It is to be observed that the weld produced is entirely independent of the personal equation of the operator. All circuit-opening devices for disconnecting the current supply when the weld is completed are eliminated. The need for such circuit-breakers when using direct current has hitherto been prohibitive, because the currents handled are of necessity very large. So far as I am aware, also, this is the first practical application of the storage battery to electric welding.

I claim:

1. The method of electric welding, which consists in first accumulating in storage cells connected in series a definite amount of energy from a direct current of electricity, and then discharging said energy from said cells connected in multiple to the welding electrodes.

2. The method of electric welding, which consists in first connecting storage cells in series and charging the same with a direct current for a predetermined time period, and then connecting said cells in multiple with the welding electrodes and discharging at said electrodes the energy accumulated in said cells.

3. An apparatus for electric welding, comprising a source of current, cells wired for series connection with said source, welding electrodes wired for multiple connection with the cells and switches for electrically connecting the cells in series to said source for gradually charging the cells and for connecting the electrodes in multiple to said cells for suddenly discharging the energy of the charged cells to the electrodes.

4. An apparatus for electric welding, comprising a source of current, cells wired for series connection with said source, welding electrodes wired for multiple connection with the cells and switches for electrically connecting the cells in series to said source for gradually charging the cells and for connecting the electrodes in multiple to said cells for suddenly discharging the energy of the charged cells to the electrodes, and timing mechanism for automatically controlling the charging period.

In testimony whereof I have affixed my signature in presence of two witnesses.

HARRY R. WOODROW.

Witnesses:
GERTRUDE T. PORTER,
MAY G. McGARRY.